United States Patent [19]
Elliott et al.

[11] Patent Number: 6,129,852
[45] Date of Patent: *Oct. 10, 2000

[54] FLOW CONTROL MEMBER FOR A FILTER CARTRIDGE CLEANING SYSTEM

[75] Inventors: Jeff Elliott, West Pennant Hills; George Wilson, Winston Hills, both of Australia

[73] Assignee: Goyen Controls Co. Pty Ltd., Milperra, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,736

[22] PCT Filed: Jul. 27, 1995

[86] PCT No.: PCT/AU95/00459

§ 371 Date: Apr. 24, 1996

§ 102(e) Date: Apr. 24, 1996

[87] PCT Pub. No.: WO96/03195

PCT Pub. Date: Feb. 8, 1996

[30] Foreign Application Priority Data

Jul. 28, 1994 [AU] Australia ............ PM 7113

[51] Int. Cl.[7] .................................... B01D 46/04
[52] U.S. Cl. ............ 210/791; 210/797; 210/798; 210/333.01; 210/411; 55/294; 55/302
[58] Field of Search ............. 210/108, 333.01, 210/341, 791, 797, 798, 409, 411, 412; 55/294, 295, 302

[56] References Cited

U.S. PATENT DOCUMENTS

| 4,155,850 | 5/1979 | Rathbone et al. ............ 210/108 |
| 4,280,826 | 7/1981 | Johnson, Jr. ................. 55/302 |
| 4,504,288 | 3/1985 | Kreft ........................... 55/302 |
| 4,539,025 | 9/1985 | Ciliberti et al. ............. 55/302 |
| 4,731,100 | 3/1988 | Loeffelmann et al. ....... 55/302 |
| 4,836,834 | 6/1989 | Steele ........................... 55/302 |
| 5,002,594 | 3/1991 | Merritt ......................... 55/302 |
| 5,199,965 | 4/1993 | Van Ackeren ............... 55/302 |

FOREIGN PATENT DOCUMENTS

4242991A1 12/1982 Germany.

*Primary Examiner*—Robert J. Popovics
*Attorney, Agent, or Firm*—McGuireWoods, LLP

[57] ABSTRACT

The present invention relates to flow control devices (4) for use with cartridge filter cleaning systems. The flow control device (4) includes a cylindrical portion (8) which extends away from a conical portion (6). When the device (4) is used with a nozzle (9) attached to a blow tube (13) the device (4) will uniformly clean a dirty cartridge filter (5). The advantage of the invention is that the device (4) can be used in the current range of air flow rates and nozzle sizes that are used in the cartridge cleaning industry. Whereas the prior art systems (7) show deficient performance when used across the full range of air flow rates currently applicable in industry.

33 Claims, 6 Drawing Sheets

FLOW CONTROL MEMBER FOR A FILTER CARTRIDGE CLEANING SYSTEM

FIELD OF INVENTION

The present invention relates to flow control systems for controlling direction, pressure and effect of the airflow utilised to clean filter cartridges in filter cartridge cleaning systems.

BACKGROUND ART

Conventional cartridge filters are generally in the form of elongated cylinders open at one end and closed at the other, and are cleaned by a reverse pulse of air. This air is generally emitted from a blow tube into the open end of each cartridge. Airflow control and direction modifiers such as venturis, although widely used, do not substantially improve on the cleaning effectiveness.

A particular difficulty experienced by such cleaning system is that a portion of the cartridge, particularly that portion closest to the source of reverse flowing air, does not experience any cleaning at all, whereas that portion that is cleaned tends to be over cleaned and becomes cumulatively damaged as a result.

Tests conducted on cartridges in reverse pulse cleaning systems have shown that along the internal length of the cartridge, cleaning pulse pressures vary markedly. Observation shows an excessive positive air pressure is applied to part of the filter which over cleans, whilst at other parts (which are generally closest to the reverse pulse source) are subject to a low or even negative pressure, which results in a poor cleaning at those parts.

One possible solution to this difficulty is described in German Specification DE4308286A1 of Bissinger GmbH. In this specification there is disclosed the use of a conical element which is interposed between an outlet nozzle and the inlet to a filter cartridge. DE4308286 teaches that the effect of the cone is to produce a sufficient pressure to be built up along the entire length of the filter element. This pressure produces a reverse air flow through the filter element to dislodge particles on the outside of the filter cartridge element.

A conical element similar to DE4308286 has been shown in tests conducted by the applicant to be ineffective as the minimum nozzle orifice diameter increases and the air flow rate increases.

It is unknown as to why such a result occurs, however it does cause a difficulty to the filter cleaning industry in that the cone of DE4308286 is not useful under the current range of conditions that are utilised in the filter cleaning industry.

OBJECT

It is an object of the present invention to provide an flow control member which is suitable across the range of commercially used nozzle sizes and cleaning air flow rates used in cartridge cleaning systems.

SUMMARY OF INVENTION

The invention provides a flow control member for a cartridge cleaning apparatus, said apparatus being of the type that utilises compressed air directed into the open end of a cartridge filter; said flow control member being adapted to be positioned in a cleaning air flow directed toward said open end, said flow control member adapted to modify said cleaning air flow so that the internal portions of said cartridge are subjected to substantially uniform pressure exerted by said cleaning air flow, said flow control member including a divergent portion having a crest facing the direction of said air flow and a flow redirection surface adapted to redirect said air flow after it has passed over said divergent portion from which extends an air flow redirection surface and before it exits the cartridge filter.

Preferably the flow control member is positioned in the air flow entirely externally of the filter cartridge.

Preferably the divergent portion is substantially curved.

Preferably the divergent portion is substantially a cone.

Preferably the divergent portion is substantially a pyramid.

Preferably the air flow redirection surface is substantially cylindrical portion.

Preferably the air flow redirection surface is a substantially curved surface when viewed in cross section.

Preferably the air flow redirection portion is a frusto-conical portion.

Preferably the air flow redirection surface extends a distance of greater than 5 millimeters.

Preferably the distance is between 10 and 25 millimeters.

Preferably a curved surface is present between the divergent portion and the flow redirection surface.

Preferably the curved surface has a radius of between one and ten millimeters.

Preferably the radius is three millimeters to six millimeters.

Preferably the flow control member is adapted to be clamped to a nozzle which is connected to a blow tube.

Preferably the flow control member has at least one support arm.

Preferably there are four such support arms.

Preferably the support arms are connectable to a clamping ring.

Preferably a positioning means keeps the apex (or its equivalent) a predetermined distance away from said nozzle.

Preferably the flow control member has a cavity adjacent the divergent portion and flow redirection surface.

Preferably it has holes interconnecting the surface of the divergent portion and a cavity located adjacent thereto.

Preferably the holes are substantially parallel to an axis of said flow control member.

The invention also provides a method of cleaning filter cartridges, said cleaning being performed by means of cleaning air flowing into the filter opening from a clean air side in order to remove particles deposited on the outside of a filter element, said method being characterised by the provision of uniform air pressure along a substantial area of the internal wall of the filter element being produced by means of a flow control member having a divergent portion and an air flow redirection surface cooperating therewith, said flow control member being placed in the cleaning air flow path before it reaches the internal filtering surfaces of said filter cartridge.

Preferably the divergent portion is substantially a cone or a pyramid.

Preferably the air flow redirection surface is substantially cylindrical, or curved or frusto-conical in shape.

The invention further provides a kit of parts including a flow control member as described above.

The invention also further provides a flow control member for a cartridge filter cleaning system, said cleaning system including a source of air under compression and a means to carry said air to said filter element for cleaning purposes, said flow control member including a divergent air flow control surface and an air flow redirection surface located in the flow path of said air, whereby said air is directed to act upon the internal surfaces of the filter element.

Preferably the flow control surface and the flow redirection surface are respectively conical and cylindrical, or conical and curved when view in cross section, or a cone and a frusto-conical portion having a smaller cone angle than the cone.

Preferably the flow control surface and the flow redirection surface are respectively pyramidal and cylindrical, or pyramidal and curved when viewed in cross section, or pyramidal and a frusto-conical portion, or pyramidal and a polygonal prism.

Preferably the flow control surface and the flow redirection surface are respectively part spherical and cylindrical, or part spherical and curved when viewed in cross section, or part spherical and a conical or tapered portion.

Preferably the flow control member influences the air flowing over it after the air flow has exited the nozzle but before it enters the filter Preferably the flow control member influences the air flowing over it as the air flow enters the filter.

Preferably the flow control member influences the air flowing over it once the air flow has entered the filter.

The advantages provided by the features of the invention include the fact that a single flow control member can be provided to improve the efficiency and efficacy of the cartridge cleaning system. Having a single flow control member reduces the inventory and provides a "one part fits all" type retrofitting kit. The use of such a flow control member will also provide monetary and labour savings for the users by reducing the amount of compressed air used to clean the filters as well as increasing the service life of the cartridge filter elements.

Throughout the specification and claims "cone angle" of a cone or a frustrum of a cone, is defined to be that angle formed between two diametrically opposed lines on the surface of the cone or frustrum of a cone, and intersecting at the apex the cone or at the imaginary or theoretical apex of the frustrum, as the case may be.

BRIEF DESCRIPTION OF THE DRAWINGS

An embodiment of the invention will now be described by way of example only with reference to the accompanying drawings in which.

DETAILED DESCRIPTION OF THE DRAWINGS

Figure 1:
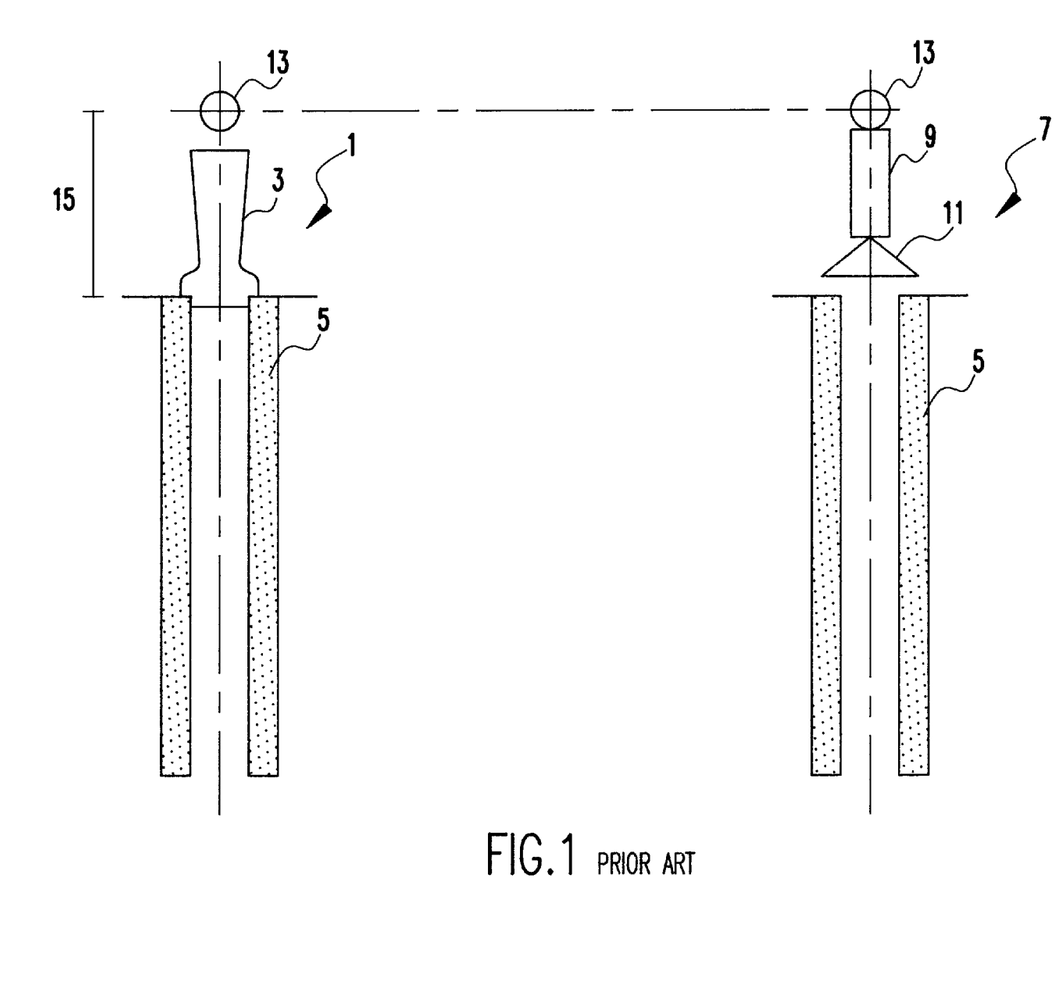
FIG. 1 is a diagrammatic side elevation of two prior art arrangements.

In FIG. 1, the prior art system 1 utilises a venturi 3 to direct compressed air emitted from a hole in a blow tube 13. This system has been tested under normal operating conditions and found to produce a considerable gradation of pressures along the length of the filter cartridge 5, whereby the top 150 to 200 mm of the cartridge is not effectively cleaned. Cartridges are normally made to either a European or American standard. The American standard are approximately 600 mm in length whereas in the European standard they are approximately 1000 mm in length.

The gradation of pressures produced in the cartridge filter 5 results in insufficient cleaning or no cleaning of some portions whilst over cleaning others.

The prior art system 7 utilises a nozzle 9 and a cone 11 to control the flow of air which is emitted from a blow tube 13. This system 7 is similar to that described in German patent 4308286. This prior art system 7 provides a more even range of pressure distribution along the length of the filter cartridge 5. This results in a more even cleaning across the whole length of the cartridge 5.

However, prior art system 7 has been found to have difficulties when tested across the range of service conditions currently used in filter cartridge cleaning systems.

In tests conducted on the prior art system 7, compressed air under a header pressure of 70 to 80 psig (the normal pressure level used in filter cleaning systems) was used as the source for the cleaning air. This air was ejected from nozzles and over a cone (having a base diameter of 103 mm and a cone angle of 70 degrees, which results in a height, from the base to the apex of approximately 74 mm) with the effect on cleaning efficacy on a test filter (that is a measure of the cleaning or reverse air flow rate induced) being monitored.

Each test was run with a nozzle of a different size, having minimum orifices of 11 mm, 13 mm, 14 mm and 16 mm. With one exception, increasing nozzle size resulted in an effective increase in the air flow rate through the filter. However, no increase was obtained in the reverse air flow rate through the test filter (thus indicating no increase in the cleaning efficacy) between the 14 mm nozzle and the 16 mm nozzle.

Such filters as require cleaning by the relatively high flow rates possibly using a 16 mm nozzle at 70 to 80 psig need such a high flow rate because when they are filtering air or gas they use a relatively high flow rate during this filtration process. Thus if the air emitted from the cleaning nozzles is incapable of producing a reverse air flow through the filter medium, cleaning will not result. The intensity of reversal will determine the efficacy of cleaning.

It was these difficulties with the prior art that led to the discovery and inventive embodiments described below.

Figure 2:
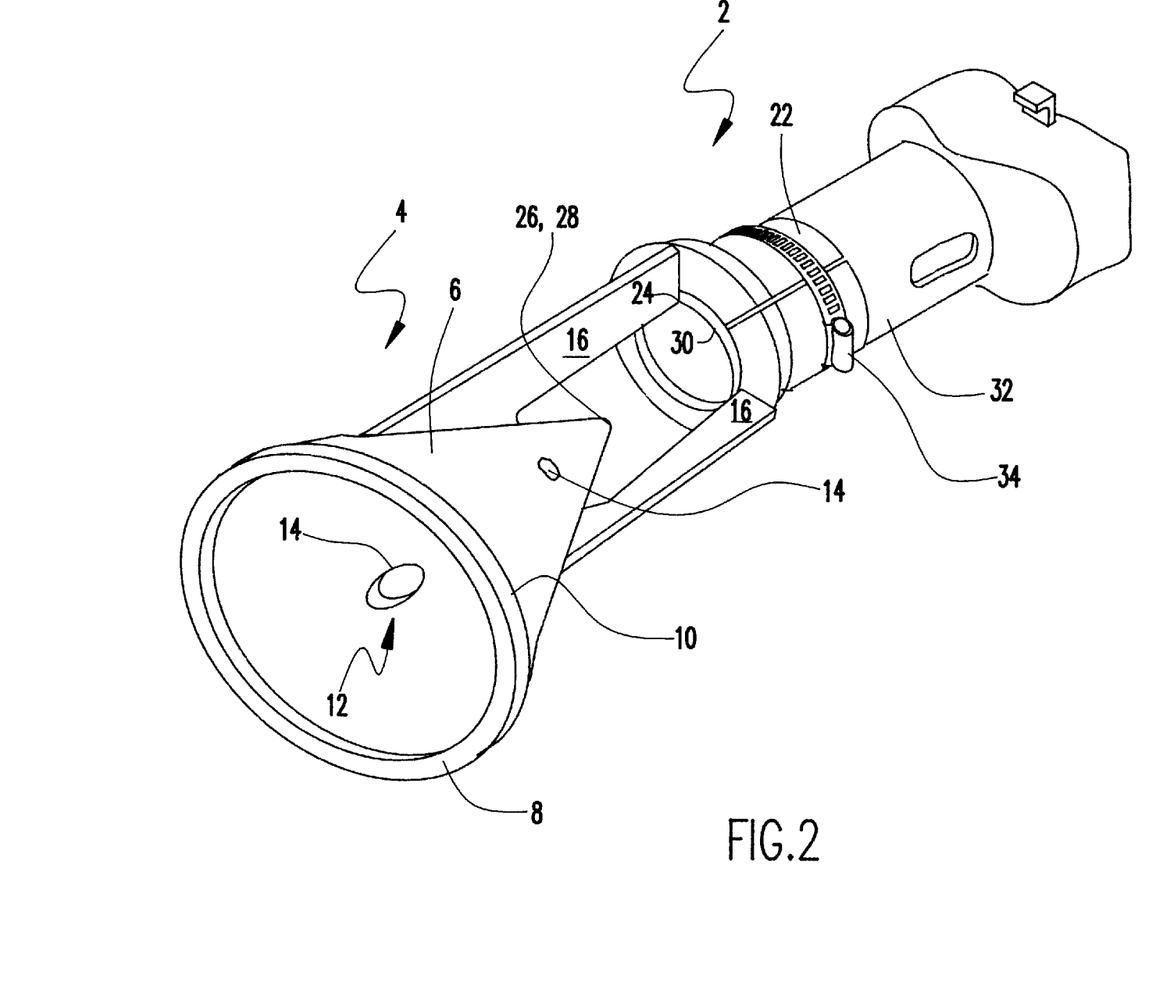
FIG. 2 illustrates a perspective view of an inventive flow control member.

Illustrated in FIG. 2 is a cartridge cleaning nozzle 2 which includes a flow control member 4 having a conical portion 6 and a cylindrical portion 8 which extends away from the base of the conical portion 6. The intersection of the cylindrical portion 8 and the conical portion 6 is rounded having a radius 10. The radius 10 is 5 millimeters but can be in the range of 1 to 10 millimeters.

Figure 7:
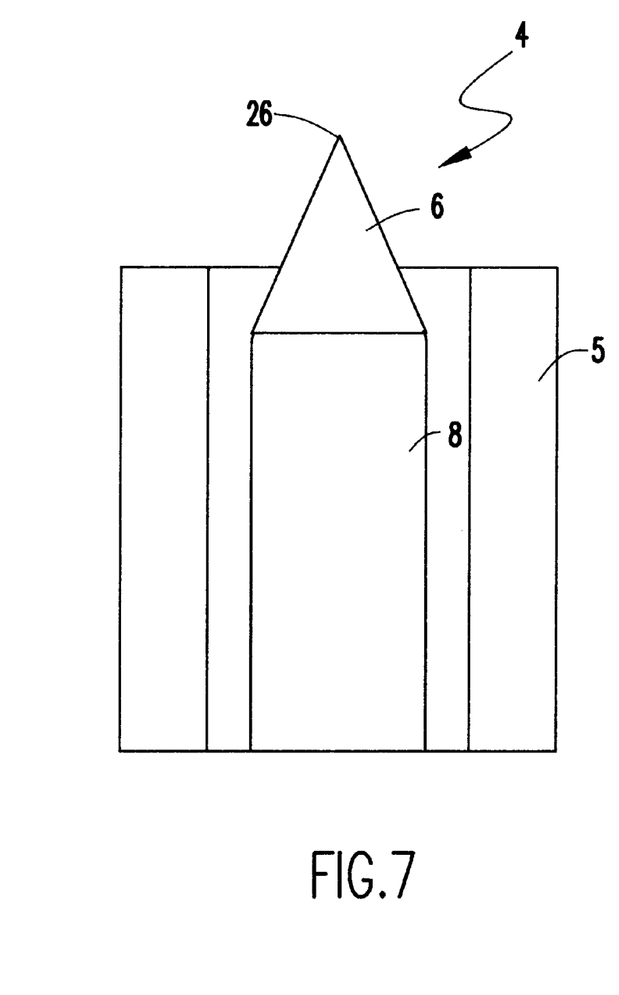
FIGS. 7 and 8 illustrate side sectional views of other embodiments of the invention.
Figure 8:
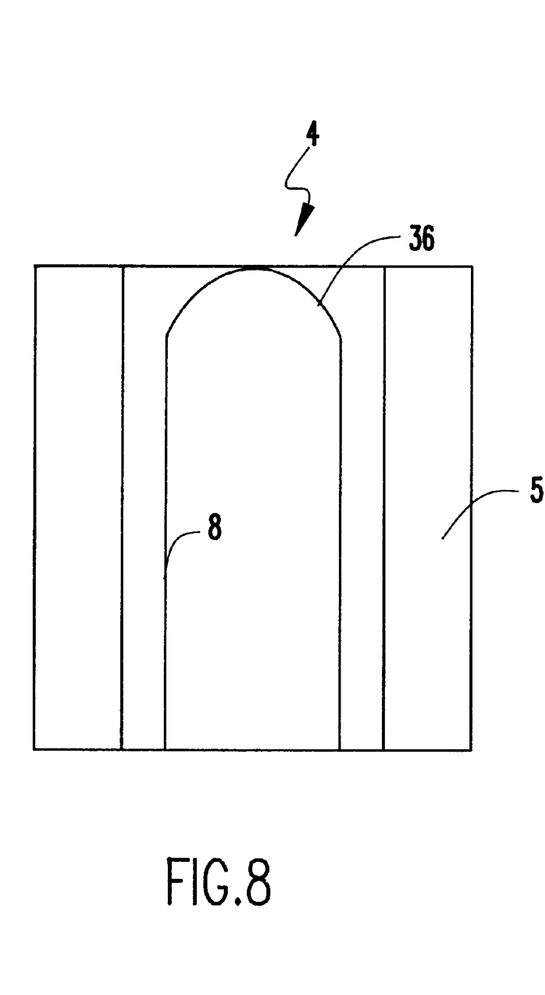
Figure 9:
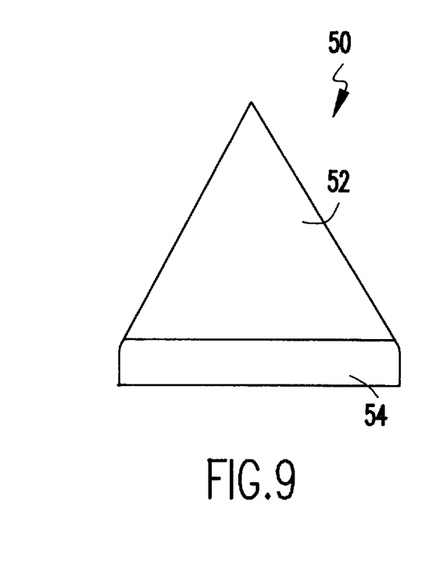
FIGS. 9, 10, 11 and 12 illustrate other flow control members of the present invention

The cylindrical portion 8 extends approximately 13 millimeters beyond the base of the conical portion 6, measured in the direction of the conical axis, that is that axis that passes through the apex of the cone and the centre of the base. Other distances could be used and depending on the pressures used in the cleaning system and the nozzle sizes a distance of greater than 5 millimeters is appropriate. For most practical purposes it is unnecessary to exceed 25 millimeters, except where constructional features, such as is shown in FIGS. 7 or 8, requires a greater length.

The conical portion 6 and cylindrical portion 8 are formed as a cup-like structure with a hollow interior 12. Interconnecting the hollow interior 12 and the outside surface of the conical portion 6 are four holes 14 which have axes substantially parallel to the conical axis.

Each hole 14 is located approximately equidistant between four legs 16, which extend from the conical portion 6.

Figure 3:
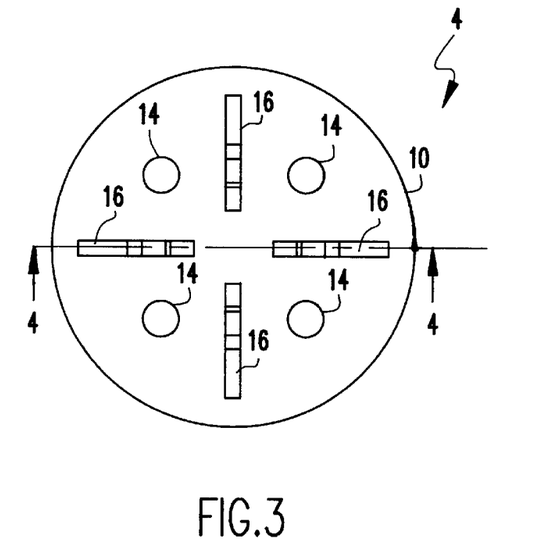
FIG. 3 illustrates a plan view of the flow control member of FIG. 2.
Figure 4:
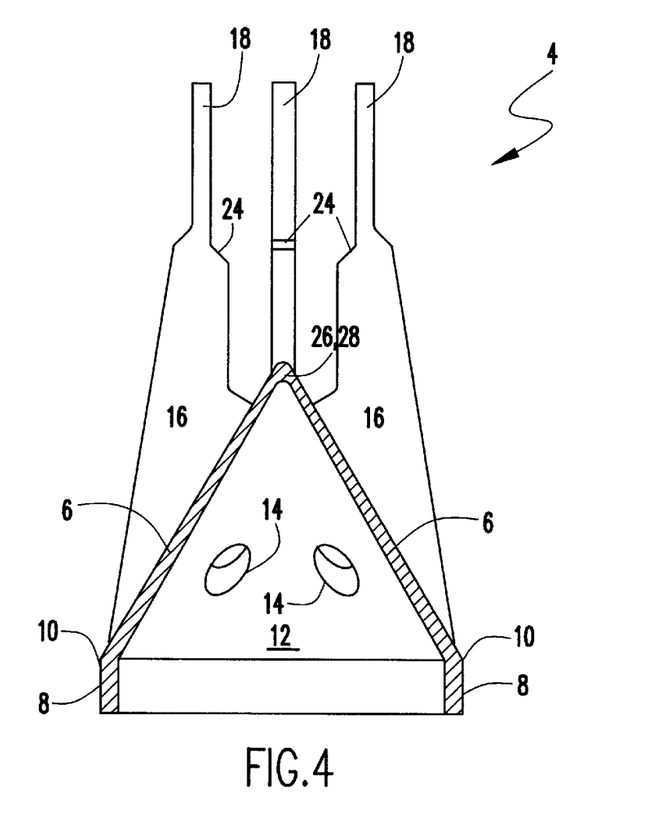
FIG. 4 is a cross section of the member of FIG. 3 through line 4—4.
Figure 5:
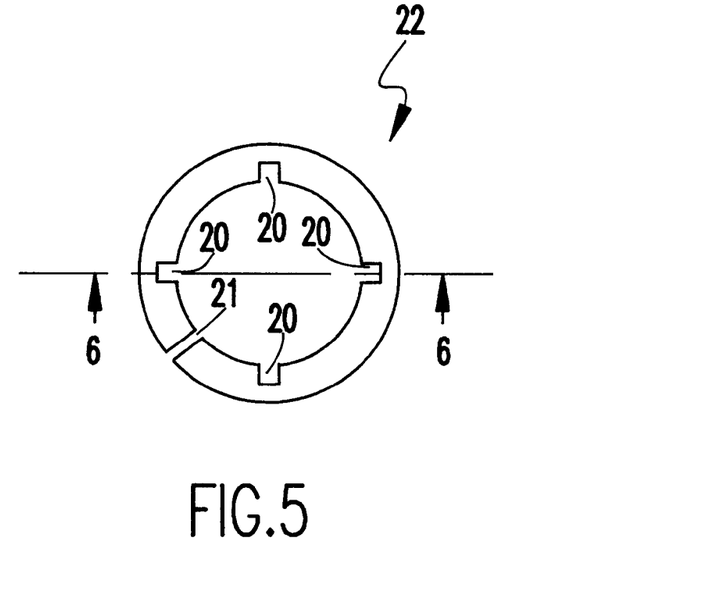
FIG. 5 is a side view of a clamping member used in FIG. 2.
Figure 6:
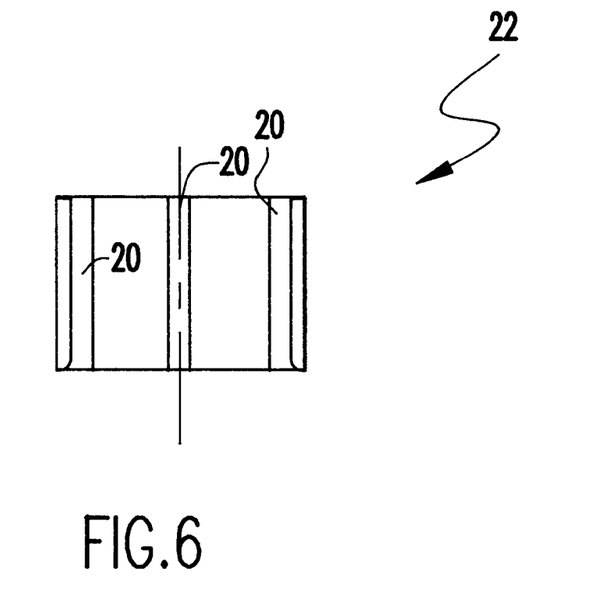
FIG. 6 is a cross section through the line 6—6 of FIG. 5

Each leg 16 as is illustrated in FIGS. 2 and 3 is approximately 3 mm in thickness. Thinner legs, would less obstruct air flow around them, but are difficult to injection mould. Each of leg 16 has an extension 18 adapted to fit into a mating recess 20 in a clamping collar 22 more clearly illustrated in FIGS. 4 and 5. The clamping collar 22 includes a split 21 which allows it to be tightened around the outer diameter of an appropriately sized nozzle.

At the junction of the extension 18 and legs 16 is a shoulder 24. The conical portion 6 has a rounded crest 26 with a theoretical cone apex 28 at a point upstream of the crest 26. The distance between the crest 26 and the shoulder 24 is set to achieve the desired results from the flow control member 4 in the filter cleaning system. This distance is positively set by the shoulder 24 engaging the rim 30 of nozzle 32. ensuring that the crest 26 is kept in use at a predetermined distance (in this instance 20 millimeters) from the exit plane of the blow tube nozzle 32. The clamping collar 22 and the members 18 are then clamped into position by means of a pipe clamp 34. The clamping force tends to force together the portions of the clamping collar 22 on either side of split portion 21. Although the most preferred distance is 20 millimeters, other distances can be utilised, with the preferred distance being in the range of 10 to 40 mm.

In operation, the cylindrical portion 8 is thought to prevent the separation of air flowing over the conical portion 6 which normally would separate after it had passed the end of the conical portion 6.

The nozzle 32 is secured to a blow tube 13 by means of a strap system (not illustrated) which is then clamped into place. (PCT/AU94/00520 shows the clamping system). However it will be readily understood that the clamping collar 22 can be selected so that its inside diameter is sized and for attachment to any sized or shaped nozzle which may already be existing and attached to a blow tube.

In FIG. 2 the flow control member 4 is shown attached by means of legs 16. Alternatively it can be installed outside, in the centre of the opening of a cartridge filter, held by a a support rod (not illustrated)will extending from a central clamping rod (not illustrated) normally used to hold such cartridge filters in position.

The cartridge cleaning nozzle 2 illustrated in FIG. 2 which includes the nozzle 32, is designed to be retro fitted and be correctly located when used with a cartridge nozzle 2 when the distance 15 (see FIG. 1) between the blow tube 13 and the filter cartridge 5 is in the range of 300 to 450 millimeters. If the height between the filter cartridge and the blow tube is less than 300 millimeters a different nozzle 32 arrangement or size may be required or alternatively the flow control member 4 could be mounted above the filter cartridge by means of a support extending from the filter cartridge or from its associated clamping system.

The cartridge cleaning nozzle 2 of FIG. 2 is packaged in a kit of parts which make up a retro fitting kit. The kit must include a flow control member and can include a nozzle 32, various sizes of insertable orifices for the nozzle 32 and clamping and securing means for all components.

Another location for a flow control member is in the mouth of the filter cartridge as illustrated in FIG. 7. In FIG. 7 the flow control member 4 which includes a conical portion 6 and a cylindrical portion 8 can be constructed as part of, or added to the filter cartridge 5, on the inside of the filter cartridge 5. It will be noted that the cone 6 has its crest 26 above the inlet to the cartridge 5. The flow control member of FIG. 7 is thus positioned so that air flowing over it exerts a substantially uniform pressure on the internal surfaces of the filter cartridge.

FIG. 8 shows an alternative flow control member having a cylindrical portion 8 and a curved divergent portion 36 instead of the conical portion 6 shown in FIG. 7.

These alternatives partly or fully located inside the filter cartridge, can provide more effective cleaning of filter cartridges, under various rates of air flow, various nozzle geometry or various other flow characteristics.

Illustrated in FIGS. 9 to 12 are other shaped flow control members which operate in the same manner as the flow control member 4 of FIG. 2. The flow control members 50 each have a conical portion 52 and in FIG. 9 the flow redirection surface 54 is a convergent curved surface. Preferably the surface 54 of FIG. 10 terminates so that a tangent to the member 50 at the furthest downstream end is approximately parallel to the axis of the cone 52.

Figure 10:
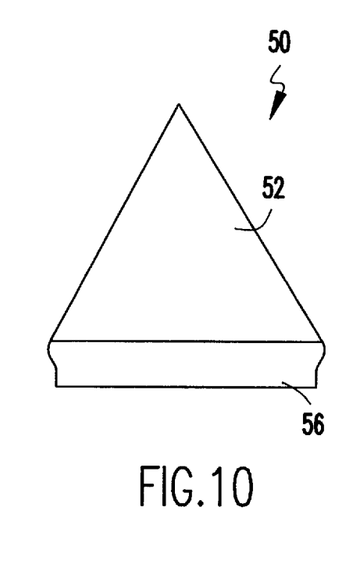

In FIG. 10 the flow redirection surface 56 is a partially convergent and partially divergent curved surface which also terminates so that the tangent at the furthest downstream end is approximately parallel to the axis of the cone 52.

Figure 11:
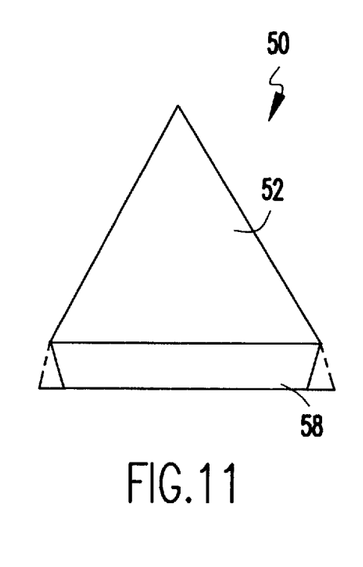

In FIG. 11 the flow redirection surface 58 is shown as a convergent frusto-conical surface (tapered inwardly). The angle of the frusto-conical surface 58 is selected so as to ensure that the flow redirection surface 58 will have the desired effect. A divergent frusto-conical surface 59 of a different cone angle to the cone 52 may also achieve the desired effect, however it is envisaged that the cone angle selected for the frusto-conical portion 58 would have to be relatively small, for example of the order of 1 to 20 degrees. The maximum cone angle selected for a divergent frusto-conical portion would be determined according to the effect which results.

Figure 12:
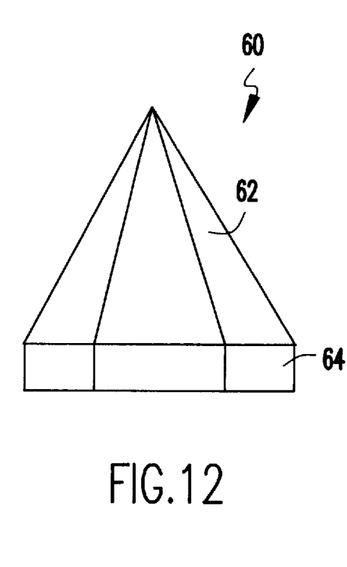

In FIG. 12 is a flow control member 60 which has a hexagonal pyramid divergent portion 62 and a hexagonal prismatic portion 64 which acts as a flow redirection portion in much the same way as cylinder 8, curved surfaces 54 and 56, and conical portions 58 and 59 do.

It is envisaged that where a particular divergent portion is selected a corresponding prismatic portion is also selected. For example cone/cylinder (circular prism), hexagonal pyramid/hexagonal prism, square pyramid/rectangular prism. Whilst for ease of manufacture such a combination of shapes would be most desirable, mixed combinations could also be used as flow control members, such as hexagonal pyramid and cylindrical.

The foregoing describes embodiments of the present invention and modifications by persons skilled in the art can be made thereto without departing from the scope of the present invention.

We claim:

1. A flow control member for a cartridge cleaning apparatus that utilizes compressed air directed into an open end of a cartridge filter discharged from an air flow nozzle and being adapted to be positioned in a cleaning air flow directed toward the open end, the flow control member comprising:

a divergent portion mountable to said air flow nozzle and having a crest facing the direction of said air flow and a base opposing the crest; and a flow redirection surface extending from the base and adapted to redirect said air flow after it has passed over said divergent portion and before it exits the cartridge filter, wherein the divergent portion and the flow redirect surface modify the cleaning air flow so that the internal portions of said cartridge are subjected to substantially uniform pressure exerted by said cleaning air flow.

2. A flow control member as claimed in claim 1 wherein the flow control member is positioned in the air flow entirely externally of the filter cartridge.

3. A flow control member as claimed in claim 1 wherein the divergent portion is substantially curved.

4. A flow control member as claimed in claim 1 wherein the divergent portion is substantially a cone.

5. A flow control member as claimed in claim 1 wherein the divergent portion is substantially a pyramid.

6. A flow control member as claimed in claim 1 wherein the air flow redirection surface is substantially cylindrical portion.

7. A flow control member as claimed in claim 1 wherein the air flow redirection surface is a substantially curved surface when viewed in cross section.

8. A flow control member as claimed in claim 1 wherein the air flow redirection portion is a frusto-conical portion.

9. A flow control member as claimed in claim 1 wherein the air flow redirection surface extends a distance of greater than 5 millimeters.

10. A flow control member as claimed in claim 9 wherein the distance is between 10 and 25 millimeters.

11. A flow control member as claimed in claim 1 wherein a curved surface is present between the divergent portion and the flow redirection surface.

12. A flow control member as claimed in claim 11 wherein the curved surface has a radius of between one and ten millimeters.

13. A flow control member as claimed in claim 12 wherein the radius is three millimeters to six millimeters.

14. A flow control member as claimed in claim 1 wherein the flow control member is adapted to be clamped to the nozzle which is connected to a blow tube.

15. A flow control member as claimed in claim 1 wherein the flow control member has at least one support arm.

16. A flow control member as claimed in claim 15 wherein there are four such support arms.

17. A flow control member as claimed in claim 15 wherein each of the support arms are connectable to a clamping ring.

18. A flow control member as claimed in claim 1 wherein a positioning means keeps the apex a predetermined distance away from a point of emission of cleaning air.

19. A flow control member as claimed in claim 1 wherein the flow control member has a cavity adjacent the divergent portion and flow redirection surface.

20. A flow control member as claimed in claim 1 having holes interconnecting the surface of the divergent portion and a cavity located adjacent thereto.

21. A flow control member as claimed in claim 20 wherein the holes are substantially parallel to a central axis of said flow control member.

22. A kit of parts including a flow control member as claimed in claim 1.

23. A filter cartridge cleaning system, said system including a flow control member as claimed in claim 1 wherein the flow control member influences the air flowing over it after the air flow has exited the nozzle but before it enters the filter.

24. A filter cartridge cleaning system, said system including a flow control member as claimed in claim 1 wherein the flow control member influences the air flowing over it as the air flow enters the filter.

25. A filter cartridge cleaning system, said system including a flow control member as claimed in claim 1 wherein the flow control member influences the air flowing over it once the air flow has entered the filter.

26. A method of cleaning filter cartridges by means of a cartridge cleaning apparatus directed cleaning air flowing into a filter opening from a clean air side in order to remove particles deposited on an outside of a filter element, thereby cleaning the filter, said cleaning air flowing being discharged initially from an air flow nozzle, said method comprising:

placing a flow control member mounted to the air flow nozzle in a cleaning air flow path before the flow path reaches an internal filtering surfaces of said filter cartridge; and providing uniform air pressure along a substantial area of the internal wall of the filter element, said uniform air pressure being produced by the flow control member having a divergent portion and an air flow redirection surface extending from a base of the divergent portion.

27. A method of cleaning filter cartridges as claimed in claim 26 wherein the divergent portion is substantially a cone or a pyramid.

28. A method of cleaning filter cartridges as claimed in claim 26 wherein the air flow redirection surface is substantially cylindrical, or curved or frusto-conical in shape.

29. A flow control member for a cartridge filter cleaning system, said cleaning system including a source of air under compression and a means to carry said air to a filter element for cleaning purposes, said flow control member comprising:

a divergent air flow control surface having an end having a crest nearest incoming air flow resulting from said means to carry said air to a filter element for cleaning purposes and an opposing end;

an air flow redirection surface located in the flow path of said air and extending from said opposing end, wherein said air is directed to act upon the internal surfaces of the filter element; and wherein the divergent air flow control surface and the air flow redirection surface modify the air flow so that internal portions of said cartridge are subjected to substantially uniform pressure exerted by the air flow.

30. A flow control member as claimed in claim 29 wherein the flow control surface and the flow redirection surface are respectively conical and cylindrical, or conical and curved when view in cross section, or a cone and a frusto-conical portion having a smaller cone angle than the cone.

31. A flow control member as claimed in claim 29 wherein the flow control surface and the flow redirection surface are respectively pyramidal and cylindrical, or pyramidal and curved when viewed in cross section, or pyramidal and a frusto-conical portion, or pyramidal and a polygonal prism.

32. A flow control member as claimed in claim 29 wherein the flow control surface and the flow redirection surface are respectively part spherical and cylindrical, or part spherical and curved when viewed in cross section, or part spherical and a conical or tapered portion.

33. A flow control member for a cartridge cleaning apparatus that utilizes compressed air directed into an open end of a cartridge filter and being adapted to be positioned in a cleaning air flow directed toward the open end, the flow control member comprising:

a divergent portion having a crest facing the direction of said air flow and base opposing the crest, the divergent portion further having holes interconnecting a surface of said divergent portion and a cavity located adjacent thereto; and     a flow redirection surface extending from the base and adapted to redirect said air flow after it has passed over siad divergent portion and before it exits the cartridge filter, wherein the divergent portion and ther flow redirect surface modify the cleaning air flow so that the internal portions of said cartridge are subjected to substantially uniform pressure exerted by said cleaning air flow.

\* \* \* \* \*